UNITED STATES PATENT OFFICE 2,388,813

ALIPHATIC DIBASIC ACIDS

Charles F. H. Allen and James A. Van Allan, Rochester, N. Y., assignors to Eastman Kodak Company, Rochester, N. Y., a corporation of New Jersey No Drawing. Application February 13, 1942, Serial No. 430,736

1 Claim. (Cl. 260—535)

This invention relates to aliphatic dinitriles and to a process for preparing them.

Dinitriles of both the aliphatic and aromatic types have become increasingly important, owing to the fact that diamines and dibasic acids are obtainable therefrom, both of which materials are used as starting materials in the manufacture of polyamide resins of the nylon type. Moreover, in one method for manufacturing polyamide resins, dinitriles are employed as a starting material.

A group of polyamide resins which possess very useful properties are those in which the chain of atoms between the amide groups contains one or more oxygen atoms. However, the production of such polyamide resins has been retarded owing to the lack of a type of completely satisfactory starting material which could be produced in relatively large quantities.

We have now found a new type of dinitrile containing two oxygen atoms between the nitrile groups. These dinitriles give rise to new dibasic acids, which are very well suited for the production of very useful polyamide resins. Moreover, these new dinitriles can be produced in large quantities.

It is, accordingly, an object of our invention to provide new dinitriles and a process for preparing them. A further object is to provide new dibasic acids and a process for preparing them. Still further objects will become apparent hereinafter.

In accordance with our invention, we prepare dinitriles by reacting dihalides of the following general formula:

$$X-CH_2-O-(CH_2)_n-O-CH_2-X$$

wherein $n$ represents a positive integer of from two to ten and X represents halogen, with a metal cyanide, such as cuprous cyanide. Silver or mercury cyanide can also be employed. The reaction is advantageously effected in a non-aqueous medium, e. g., benzene or toluene or other hydrocarbon medium. The following examples will serve to illustrate our new dinitriles and the process for preparing them.

*Example 1.—Ethylene-1,2-dioxyacetonitrile*

59.7 g. of cuprous cyanide were suspended in 125 cc. of benzene contained in a 500 cc. three-necked flask equipped with a stirrer, reflux condenser and dropping funnel. The benzene suspension was heated to boiling on a steam bath and 39.7 g. of ethylene-1,2-oxymethyl chloride were added from the dropping funnel to the boiling suspension over a three-hour period, while stirring. When about half of the chloride had been added, the reaction mixture suddenly became pasty and impossible to stir. The remainder of the chloride was added and the reaction mixture was refluxed for nine hours. At the end of this time, the benzene layer was decanted, the benzene removed and the residue distilled. 7 to 8 g. of the dinitrile, boiling at 136° to 137° C. at 2 mm. of mercury pressure, was obtained. Analysis: calculated for $C_6H_8O_2N_2$:N, 20.0; found N, 20.0.

*Example 2.—Decamethylene-1,10-dioxymethyl nitrile*

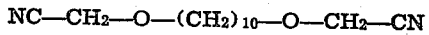

50 g. of cuprous cyanide were suspended in 114 cc. of toluene. The toluene suspension was heated to boiling and 67.5 g. of decamethylene-1,10-oxymethyl chloride were slowly added to the boiling suspension, with rapid stirring. The reaction mixture gradually became brown. After the addition of the chloride stirring and gentle boiling were continued for 9 hours. The reaction mixture was cooled, the cuprous chloride filtered off and washed with a little diethyl ether, the ether washings being added to the toluene filtrate. The toluene filtrate was treated to remove the ether and toluene and the residue was distilled at 6 mm. of mercury pressure. The yield of dinitrile was 87%, boiling point 219° to 220° C. Upon redistillation 50 g. (80% yield) of dinitrile boiling at 216° to 218° C. at 4 mm. of mercury pressure were obtained. The dinitrile solidified upon chilling. It was recrystallized from ethyl alcohol (4 cc. per gram of nitrile) and obtained as white crystals, melting at 33° to 34° C. Analysis: calculated for $C_{14}H_{24}O_2N_2$:N, 11.1%; found: N, 10.8%.

*Example 3.—Hexamethylene-1,6-dioxymethyl nitrile*

40 g. of cuprous cyanide were suspended in 100 cc. of boiling toluene. To the boiling suspension were slowly added, with vigorous stirring, 42.8 g. of hexamethylene - 1,6 - dioxymethyl chloride. After the addition of the chloride, gentle boiling and stirring were continued for 4.5 hours. The cuprous chloride was filtered off, the toluene removed from the toluene filtrate and the residue distilled in vacuo. The yield of dinitrile was 30 g. (76.5%), boiling point 205° to 208° C. at 20 mm. of mercury pressure.

In a manner similar to that illustrated in the above examples, trimethylene-1,3-, tetramethylene-1,4-, pentamethylene-1,5-, heptamethylene-1,7-, octamethylene-1,8- and nonamethylene-1,9-dioxymethyl cyanide can be prepared.

The alkylene bis oxymethyl halides employed in practicing our invention can be prepared by reacting a dihydric alcohol with formaldehyde and hydrogen halide in a non-aqueous solvent, such as benzene. See our copending application Serial No. 312,722, filed January 6, 1940.

The dinitriles obtained in accordance with our invention can be hydrolyzed, we have found, to give dibasic acids. The hydrolysis is advantageously effected in the presence of alkali, such as an alkali metal hydroxide for example. Mineral acids, such as hydrochloric and sulfuric, also accelerate the hydrolysis. The following examples will serve to illustrate our new dibasic acids and the manner of obtaining them.

*Example 4.—Decamethylene-1,10-dioxyacetic acid*

HOOC—CH$_2$—O—(CH$_2$)$_{10}$—O—CH$_2$—COOH 8 g. of decamethylene-1,10-dioxymethyl nitrile were mixed with 15 cc. of 95% ethyl alcohol and 60 cc. of 20% aqueous sodium hydroxide. The mixture was refluxed on the steam bath for 24 hours. The alcohol was then evaporated and the residue allowed to cool. It solidified to a white crystalline mass. The mass was dissolved in 250 cc. of boiling water, the resulting solution filtered while hot and acidified with hydrochloric acid. The dioxyacetic acid crystallized from the acidified solution upon cooling. It was filtered off, washed with a little cold water. It was redissolved in 60 cc. of sodium carbonate solution, the resulting solution filtered and acidified with hydrochloric acid as before. The dioxyacetic acid was then recrystallized from ligroin and obtained as white crystals melting at 84° to 86° C. Analysis: calculated for C$_{14}$H$_{26}$O$_6$: C, 57.9; H, 9.0; found: C, 58.1; H, 9.0.

*Example 5.—Hexamethylene-1,6-dioxyacetic acid*

HOOC—CH$_2$—O—(CH$_2$)$_6$—O—CH$_2$—COOH 16 g. of hexamethylene-1,6-dioxymethyl cyanide were mixed with 30 cc. of 95% ethyl alcohol and 120 cc. of 20% aqueous sodium hydroxide. The mixture was refluxed for 24 hours on a steam bath. The alcohol was then removed and the residue allowed to cool. 60 cc. of water were then added to the cool reaction mixture followed by 50 cc. of concentrated hydrochloric acid (sp. g. 1.18) with stirring. The resulting mixture was chilled and the dioxyacetic acid filtered off. The dioxyacetic acid was then dissolved in a minimum of sodium carbonate solution, the resulting solution filtered and the dioxyacetic acid reprecipitated by hydrochloric acid. The dioxyacetic acid was recrystallized from hot water and obtained as white crystals melting at 92° to 94° C. Analysis: calculated for C$_{10}$H$_{18}$O: C, 51.3; H, 7.7; found: C, 51.4; H, 7.7.

In a manner similar to that shown in Examples 4 and 5, ethylene-1,2-, trimethylene-1,3-, tetramethylene-1,4-, pentamethylene-1,5-, heptamethylene-1,7-, octamethylene-1,8- and nonamethylene-1,9- dioxyacetic acid can be prepared.

The dinitriles obtained in accordance with our invention can be made to undergo an internal condensation to yield cyclic derivatives as shown in the following example.

*Example 6.—1-cyano-4,15-dioxycyclopentadecanimide-(2)*

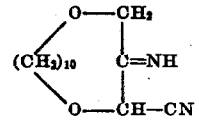

Sodium methyl anilide was prepared according to the process described in German Patent 615,468, using naphthalene, sodium, methylaniline and 3 liters of dry diethyl ether and carrying out all operations in an atmosphere of dry nitrogen. To the ether solution of the sodium methyl anilide were added 50.4 g. of decamethylene-1,10-oxymethyl nitrile in 500 cc. of dry diethyl ether, over a three-day period, using a simplification of the Ziegler high dilution apparatus (Ziegler, Ann. 504, 122–125, 1933). After the addition of the nitrile, one liter of cold water was slowly added to the reaction mixture. The etheral layer was then removed from the strongly alkaline aqueous layer. The etheral layer was washed with hydrochloric acid (170 cc. concentrated hydrochloric acid diluted to 1500 cc.) to remove the methylaniline. The ether layer was decanted from a small amount of insoluble material. Upon distillation methyl aniline and naphthalene were recovered. The residue was fractionally distilled and 19 g. of imide boiling at 155° to 167° C. at 1 mm. of mercury pressure were obtained. The imide was recrystallized several times from ligroin to give 18 g. of white crystals melting at 69° to 71° C. Analysis: calculated for C$_{14}$H$_{24}$O$_2$N$_2$; N, 11.1; found: N, 11.1.

What we claim as our invention and desire to be secured by Letters Patent of the United States is:

Decamethylene-1,10-dioxyacetic acid.

CHARLES F. H. ALLEN.
JAMES A. VAN ALLAN.